March 24, 1936.  I. H. BLOOM  2,035,218
DIRECT BY MAIL ADVERTISING DEVICE
Filed July 26, 1932  2 Sheets-Sheet 1
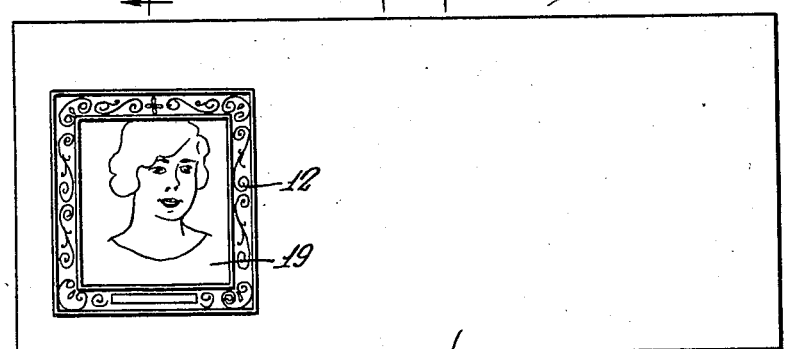
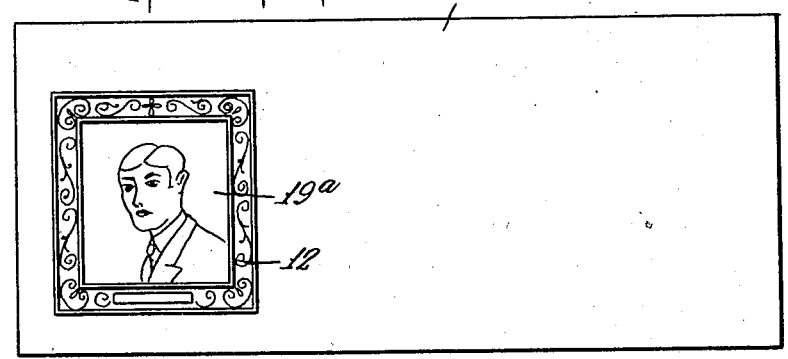
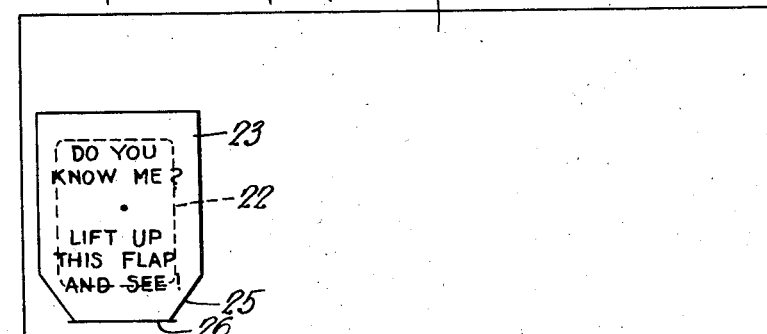
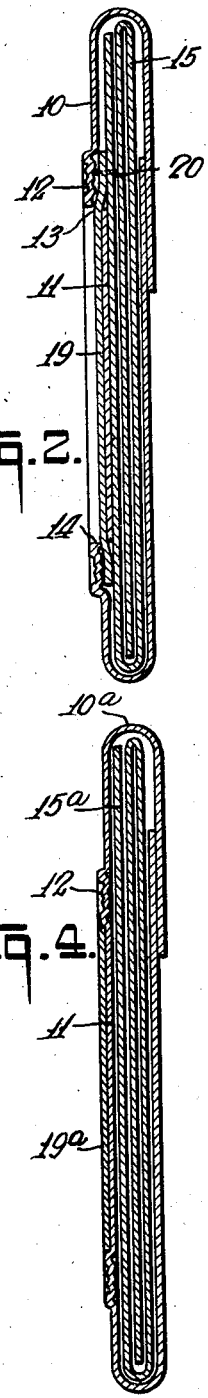
INVENTOR
*Isaac H. Bloom*
BY
*Dean, Fairbank, Hirsch* ATTORNEYS March 24, 1936. I. H. BLOOM 2,035,218
DIRECT BY MAIL ADVERTISING DEVICE
Filed July 26, 1932   2 Sheets-Sheet 2
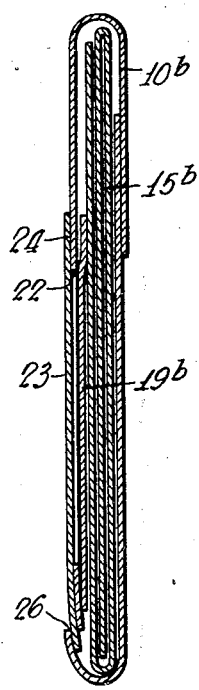
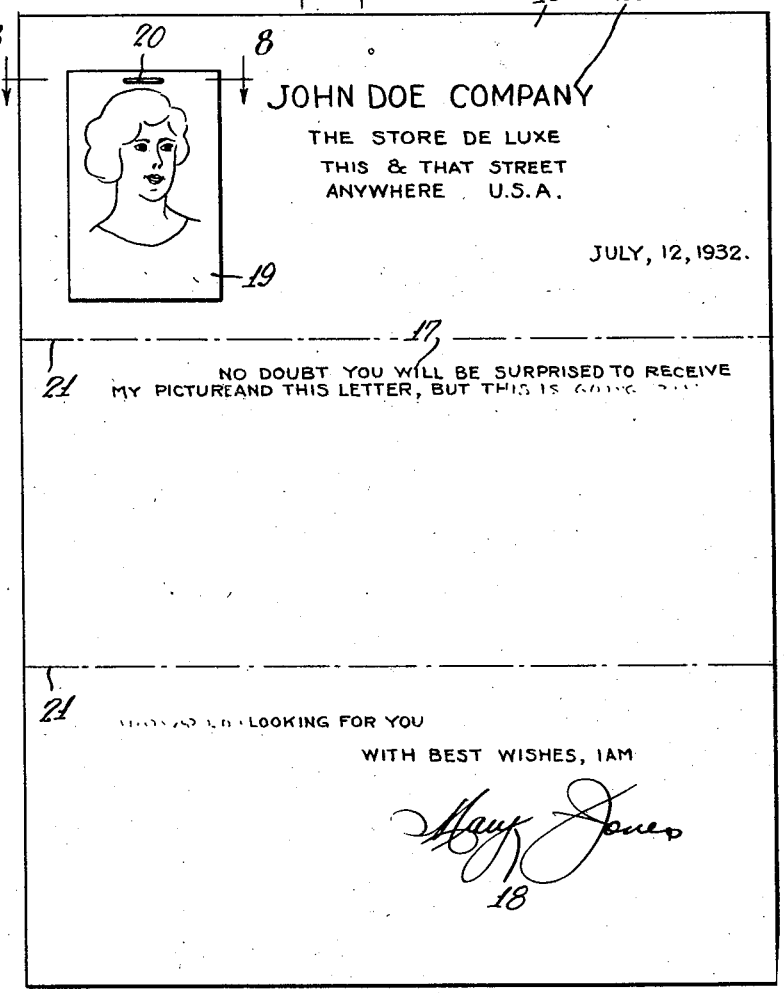
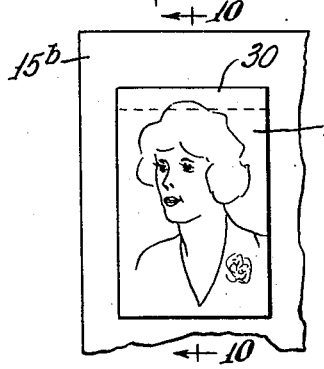
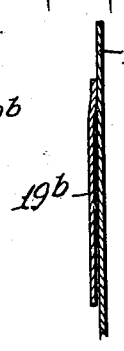
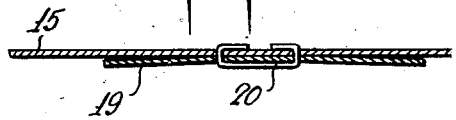
INVENTOR
*Isaac H. Bloom*
BY
ATTORNEYS Patented Mar. 24, 1936

2,035,218

UNITED STATES PATENT OFFICE 2,035,218

DIRECT BY MAIL ADVERTISING DEVICE

Isaac Herman Bloom, Pittsburgh, Pa.

Application July 26, 1932, Serial No. 624,680

1 Claim. (Cl. 229—71)

My present invention is concerned with the provision of a mailing folder for advertising purposes, designed to compel the attention of the addressee and to insure opening of the folder.

More specifically the invention is concerned with a mailing envelope and an advertising letter and with a combination of the two calculated to intrigue the curiosity of the recipient when the letter is delivered, and to further compel his sustained attention when the letter is opened.

An object of the present invention is to provide an advertising letter bearing a picture of a person known to the recipient, which picture is exposed on the outside of the envelope and compels the attention of the addressee. This arrangement prevents the mailing matter from being discarded, in that the mere presence of a familiar face makes the matter sufficiently personal to the recipient to ensure opening of the letter and reading its contents.

This method of advertising has proven highly effective in many types of sales work. It has been especially advantageous in increasing the sales of retail stores, such for instance as department stores where all of the clerks and other employees of the store send letters bearing their pictures to a great number of friends and acquaintances, ballyhooing a special sales event or otherwise arousing customer interest on more or less of a friendship basis.

An object of the present invention is to provide an advertising device of this type in which the picture exposed at the outside of the envelope has its edges fully protected so that it will not become turned or mutilated passing through standard types of cancelling machines used by the Post Office and so that it complies with Post Office requirements.

An object of the present invention, therefore, is to provide a mailing device which will permit the picture of the sender to be displayed at the outside of the envelope and yet will avoid the use of window openings.

Another object is to provide a device of this character so that the picture at the outside of the envelope tends to securely lock the envelope and the letter which it contains together, thereby permitting the letters to be sent as third-class mail without any danger of the letter becoming inadvertently displaced.

Another object of the invention is to so corelate the displayed picture and the envelope that the picture appears to be framed in an opening in the envelope even though no such opening is present.

Another object is to provide an envelope having a frame simulation embossed thereon in such manner that it will set off the picture and protect its edges and add to the attractiveness of the display.

Another object is to provide a device of the character described of extremely simple and practical construction which will involve no difficulty in inserting the contents of the envelope or in removing them, and which will be well suited to meet the requirements of economical manufacture, any slight extra cost involved in the preparation of the folders being more than compensated for by the increased effectiveness of the device as a direct by mail advertising medium.

In accordance with one embodiment of the invention the envelope is embossed to provide a raised frame surrounding a depression and the picture may be pasted or otherwise secured directly within this depression, lying substantially flush with the frame, and protected by the frame against being inadvertently torn or detached during the vicissitudes of mailing and handling.

In accordance with another embodiment of the invention the space within the frame is provided with spaced parallel slits at the top and the bottom, the picture is attached at its top to one corner of the letter and as the folded letter is inserted within the envelope the free edge of the picture passes through the uppermost slit and may have its lower edge tucked into the lower slit. By virtue of this arrangement the picture appears to be framed by the embossed frame simulation on the envelope yet is attached to the letter and remains on the letter when the latter is removed. Furthermore, with such a construction the picture constitutes a tab means for interlocking the letter and the envelope during mailing and preventing their inadvertent relative displacement.

With the type of construction described above it is unnecessary to provide any special frame as a pair of parallel slits in the envelope will suffice to permit external display of the picture, complete concealment of the letter and interlocking of the latter and envelope together.

In accordance with another embodiment of the invention an opening may be provided in the envelope and the picture, which is affixed to the letter, arranged behind the opening. A hinged flap on the envelope normally covers the opening and carries some intriguing slogan to induce the recipient of the letter to raise the flap and observe the picture beneath it. This flap is of course so arranged that it will not become accidentally torn off in the mail.

Before proceeding to describe the invention in detail, it may be noted that the term "letter" used throughout the specification and claims is to be construed broadly since it will be apparent that the picture to be displayed need not be mounted upon a letterhead but may be carried by any sort of folder, leaflet, pamphlet or other single or multiple sheet material to be mailed in the envelope.

It is noted that the term "envelope" should be given a liberal interpretation since it is intended to cover all equivalent outer wrappers or folders which may serve as mailing covers. In fact, I contemplate the use of mailing devices in which the inner surface of the cover has the advertising matter displayed directly thereon, and in which the picture may be either pasted on the outside of the cover or carried by the inner face of the back of the cover in any of the various ways discussed above.

The invention may be more fully understood from the following description taken in connection with the accompanying drawings, wherein Fig. 1 is a plan view of an envelope embodying the invention and with a picture-carrying letter or folder therein;

Fig. 2 is an enlarged transverse sectional detail on the line 2—2 of Fig. 1;

Fig. 3 is a view similar to Fig. 1 but illustrating a modified form of construction;

Fig. 4 is an enlarged transverse sectional view on the line 4—4 of Fig. 3;

Fig. 5 is a view similar to Fig. 1 but illustrating a further modification;

Fig. 6 is an enlarged transverse sectional view on the line 6—6 of Fig. 5;

Fig. 7 is a plan view of a letter sheet of the character shown in cross-section in Fig. 2;

Fig. 8 is an enlarged sectional detail on the line 8—8 of Fig. 7;

Fig. 9 is a fragmentary plan view of the corner of a slightly modified form of letter sheet; and Fig. 10 is a sectional detail on the line 10—10 of Fig. 9.

The envelope 10 shown in Figs. 1 and 2 is provided near its left-hand end with a depressed portion 11 typically of rectangular shape, and about this depression is a raised ornamental border 12 produced preferably by the same embossing process which forms the depression 11. Also in this process a pair of slits 13 and 14 may be formed in the face of the envelope along the upper and lower edges of the depressed portion 11.

A letter sheet or folder for use with the envelope of Figs. 1 and 2 is illustrated in Figs. 7 and 8. This sheet, designated generally at 15, may bear the letterhead 16 of the advertiser. The body of the letter indicated at 17 contains advertising matter of appropriate type and the signature of the letter indicated at 18 is that of the person whose picture 19 is attached to the upper left hand corner of the letter sheet.

In the present instance the photograph is stapled to the letter sheet near the upper edge of the former by a wire staple 20. When this letter is folded along the fold lines indicated at 21 in such a manner that the top of the letter is presented foremost, the letter may be slipped into the envelope 10, the unattached lower edge of the picture 19 sliding through the slit 13 and being tucked into the slit 14. The picture is slightly longer than the depression 11 and of similar width so that when the letter has been inserted into the envelope and the picture threaded through the slits as above described, the picture will appear to be framed by the embossing 12 and only upon removing the contents of the envelope will the recipient discover the fact that the picture is attached to the letter.

In using these mailing devices the sales person whose picture appears upon the letter sends them only to persons to whom he or she is known so that the picture prominently displayed at the outside of the envelope is sure to arouse sufficient interest in the addressee to compel him to open the letter and examine its contents.

In Figs. 3 and 4 I have shown an envelope 10—a in all respects similar to the envelope 10 save that the slits 13 and 14 are omitted. In this instance the letter sheet 15—a bears no picture but a photograph 19—a of the sender is pasted directly against the depressed portion 11 of the envelope and has all its edges protected by the encircling frame 12.

In Figs. 5 and 6 I have shown a further modification of the invention in which the envelope 10—b is provided with a window opening 22 therein, this opening being normally covered by a flap 23, the upper edge of which is pasted to the envelope above the opening. The lower tapered end 25 of the flap is adapted to be tucked into a slit 26 formed in the envelope at a point below the framing opening 22. In this case the picture 19—d to be displayed may be pasted or otherwise secured at the upper left hand corner of the letter sheet, one typical method of attachment being shown in Figs. 9 and 10 where the photograph is gummed near its top as indicated at 30 for convenient attachment to the letter sheet. In this case it is not important whether the lower edge of the picture be attached or unattached to the sheet which carries it since the picture is simply exposed behind the opening 22 rather than in any manner interlocked with the envelope. In order to induce the recipient of a letter of this character to open it the flap which covers the picture bears some appropriate legend, such as that illustrated in Fig. 5.

With the foregoing explanation of the general character of the invention and the various constructions which may be resorted to when a letter or folder is to be mailed with an inner envelope, it will be apparent that similar principles might be embodied in other types of mailing matter where the printed or written advertising indicia is carried directly by the inside of the wrapper rather than on a separate sheet contained in the wrapper.

The conventional double postcard arrangements are typical of the type of mailing matter well suited, with slight modification, to fulfill many of the requirements of the invention.

With two integrally connected folded sheets serving as a wrapper and with the advertising matter appearing on their inner faces the method of picture attachment and picture display illustrated in Figs. 3 and 4 may be most conveniently used.

It will be seen that there is herein described a device in which the several features of this invention are embodied, and which in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

The combination with an envelope having an inwardly depressed rectangular portion and including an outwardly projecting frame around said depressed area, and having a pair of parallel slits at the top and bottom of the depressed portion and within the frame, of a mailing sheet for enclosure within the envelope, a picture bearing sheet of substantially the same width as the depressed portion attached at its upper edge only to the mailing sheet and adapted when the mailing sheet is disposed within the envelope to be threaded through said slits and lie substantially in the plane of the envelope with its edges protected by said raised frame.

ISAAC HERMAN BLOOM.